March 25, 1958     J. D. HARTER     2,828,165

SAW HORSES

Filed Feb. 15, 1956

*INVENTOR.*
JAMES D. HARTER

BY *Alfred C. Body*

ATTORNEY

United States Patent Office 2,828,165
Patented Mar. 25, 1958

2,828,165

SAW HORSES

James Dwight Harter, Canton, Ohio

Application February 15, 1956, Serial No. 565,757

5 Claims. (Cl. 304—5)

This invention pertains to the art of saw horses, and more particularly to a saw horse which can be folded into a compact package.

One of the problems with saw horses has been the large bulk requiring large amounts of storage space when not in use. It has been proposed heretofore to make saw horses fold into a compact package, but heretofore such saw horses have generally not had the stability and rigidity required by the rugged stresses which are imposed on them.

A further difficulty with such folding saw horses has been that the uppermost surface normally has exposed metal, which may be accidentally contacted by a saw or other tool resulting in a dulling of such tool.

The present invention contemplates a new and improved saw horse which overcomes all of these difficulties and others and provides a saw horse which readily folds up, which is rugged and stable when in use, and has no exposed metal on the upper surface.

The invention may take physical form in certain parts and arrangements of parts preferred embodiments of which will be described in detail in this specification and illustrated in the accompanying drawings which form a part hereof and wherein.

Figure 1:
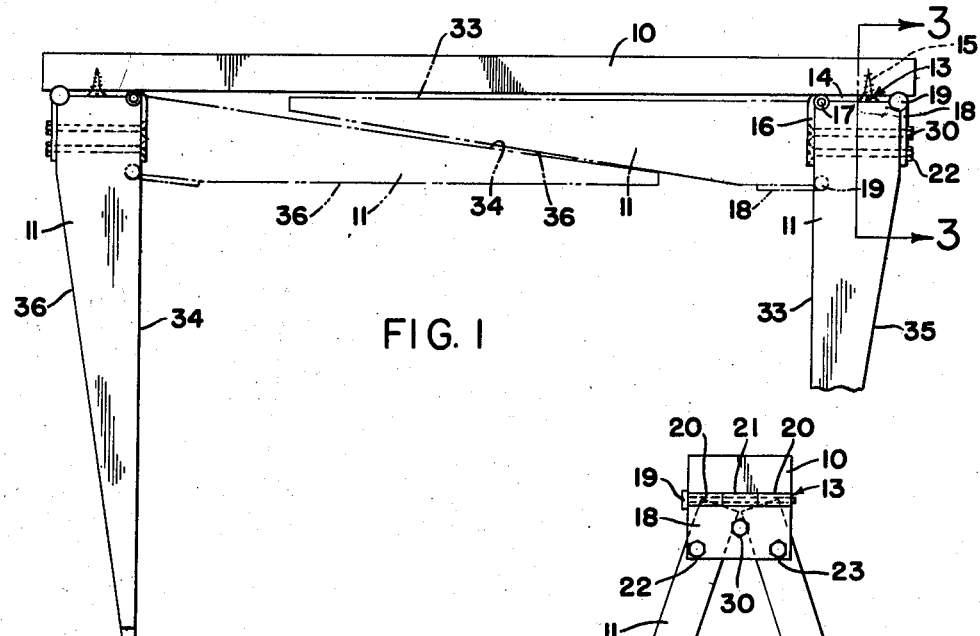
Figure 1 is a side elevational view of a saw horse embodying the present invention and showing in dotted lines the legs in folded position.

Referring now to the drawings, where the showings are for the purposes of illustrating preferred embodiments of the invention only, and not for the purposes of limiting same, the figures show a saw horse comprised of a beam 10 having disposed at each end thereof a pair of legs 11, 12 fastened to the underside of the beam 10 by means of a bracket arrangement indicated generally at 13 constructed in accordance with the present invention.

Thus, the bracket 13 is comprised of a base or sole plate 14 fastened to the under surface of the beam 10 by means of screws or bolts 15. A pivot plate 16 is hinged to the inner end of the sole plate 14 by means of a hinge pin 17, the arrangement of this hinge being such that the hinge plate 16 can pivot to a flush position with the undersurface of the beam 10. A fastening plate 18 has means for removably or detachably connecting it to the opposite end of the sole plate 14 which in the embodiment shown is a bolt or pin 19 extending through spaced sleeves 20 integrally formed with the outer end of the sole plate 14 and an intermediate sleeve 21 formed on the upper end of the fastening plate 18. The pivot plate and fastening plate 16, 18 are spaced a distance apart to receive the legs 11, 12 which in the preferred embodiment are made of 2 x 4's; thus, the opposed surfaces of the plate 16, 18 will be spaced apart a distance of three and 13 sixteenths inches.

The legs 11, 12 are pivoted relative to the plate 16, 18 by means of a pivot bolt 22, 23 respectively, each extending through a lower outer corner of the plates 16, 18 as shown in the drawings. The legs 11, 12 extend upwardly beyond the pins 22, 23 a distance such as to provide a slight clearance from the lower surface of the sole plate 14.

A hinged bracket 26 spaced from the pin 22, 23 extends between the legs 11, 12 and hold them in the outwardly pivoted position shown. This bracket when pivoted about its center pivot point 27 allows the legs to be pivoted into abutting relationship.

Figure 2:
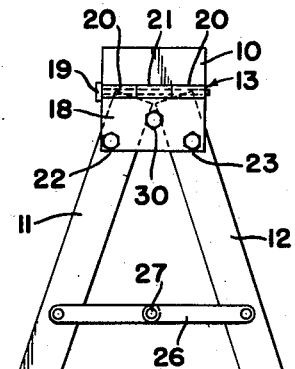
Figure 2 is a fragmentary end elevational view of Figure 1.
Figure 3:
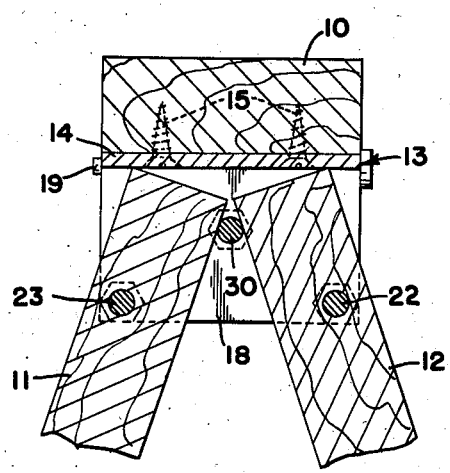
Figure 3 is an enlarged cross-sectional view of Figure 1 taken on the line 3—3 thereof.

It is to be noted that the legs 11, 12, when in the extended position shown in Figure 2, do not quite meet or just meet at the upper closed corners, and in accordance with the invention, means are provided for engaging the upper corners of the legs 11, 12 and preventing a pivoting or rocking movement of the beam 10 relative to the legs 11, 12. In the preferred embodiment, such means comprise a bolt 30 which extends parallel to the bolts 22, 23 generally midway between such bolts and positioned above the plane through the bolts 22, 23. The vertical positioning of this bolt 30 is important in that the legs 11, 12 when pivoted to the position shown in Figure 2 must engage this bolt. It is by virtue of this engagement that the stability of the saw horse of the present invention is achieved.

As indicated, the legs 11, 12 can be folded into abutting relationship by pivoting the bracket 26 at the pivot point 27. Further, the legs can be pivoted into close abutting relationship with the underside of the beam 10. To permit this, the pin 19 is removed whereupon the legs 11, 12 can then be pivoted about the axis of the pin 17 into a position underneath the beam 10. It will be noted that the beam 10 must have a length longer than any one of the legs in order to permit this.

Further, to permit the legs to fold into a compact assembled relationship, the opposed surfaces 33, 34 of the legs are made parallel while the other surfaces 35, 36 diverge outwardly in an upward direction. Thus the surface 33 folds in tight to the under surface of the beam 10. The surface 34 then folds into substantial abutting relationship with the surface 35. The surface 36 is generally parallel to the upper surface of the beam 10.

It will thus be seen that a saw horse has been described which is rugged and stable when in use, and yet may be readily folded into a compact package so that it may be readily stored away.

It will further be appreciated that using the present invention, the bracket may be sold along with a single length of 2 x 4 in what may be termed a "do-it-yourself" kit. The beam 10 is first cut, the legs are then cut by a diagonal cut across the remainder the length of the 2 x 4, the legs being drilled at their upper ends and then assembled with the bracket 13 as shown. The invention is susceptible to modifications differing from the appearance of the preferred embodiment. It is my intention to include all such modifications insofar as they come within the scope of the appended claims.

Having thus described my invention, I claim:

1. A saw horse comprised of a horizontal beam, legs under each end of said beam, a bracket for fastening the upper end of such legs to the under surface of the beam, said bracket comprising a sole plate having a pivot plate pivoted thereto at the inner end, a bracket plate operatively associated with the opposite end of said sole plate, said legs extending between said bracket and pivot plates and a pair of spaced pivot pins extending between said pivot plate and said bracket plate one through each leg whereby to pivotally support said legs relative to said plates, a third pin extending generally midway between said pivot pins and spaced above the vertical plane through such pins a distance such as to engage the opposed surfaces of said legs before such legs engage each other when in the extended position.

2. The combination of claim 1 wherein said bracket plate is detachably connected to said sole plate.

3. The combination of claim 2 wherein said legs taper toward the lower end and each have a length less than the spacing between adjacent edges of said sole plates whereby they may be folded into compact relationship under said beam.

4. A saw horse comprising in combination a horizontal beam, a pair of legs under each end of said beam, a pair of brackets one for each pair of legs for fastening said legs to the under surface of said beam, each of said brackets being comprised of a sole plate fastened to the under surface of said beam and having on the end remote from the end of said beam a pivot plate pivoted so as to pivot flush with the under surface of the beam, a fastening plate detachably connected to the end of said sole plate adjacent the ends of said beam and spaced from the pivot plate a distance to receive the upper ends of said legs therebetween, pivot pins extending between the pivot plate and the fastening plate through an upper end of each leg, and a third pin extending between said plates generally midway between said pivot pins and in the plane above such pivot pins a distance such that it engages the opposed surfaces of the legs before such surfaces engage each other.

5. A saw horse comprised of a horizontal beam, legs under each end of said beam, a pair of brackets, one for each end of said beam for fastening the upper ends of such legs to the undersurface of said beam, said bracket comprising a sole plate having a downwardly extending member at the end remote from said beam end and a downwardly extending member adjacent said beam end, said legs extending between said members and a pair of spaced pivot pins extending between said members, one through each leg whereby to pivotally support said legs relative to said plates, a third pin extending generally midway between said pivot pins and spaced above the vertical plane through such pins a distance such as to engage the opposed surfaces of said legs before such legs engage each other when in the extended position.

References Cited in the file of this patent
UNITED STATES PATENTS

| | | |
|---|---|---|
| 321,221 | Johnson | June 30, 1885 |
| 538,748 | Schroder et al. | May 7, 1895 |
| 1,656,558 | Dysinger | Jan. 17, 1928 |
| 1,711,328 | Russell | Apr. 30, 1929 |
| 2,271,701 | Maxwell | Feb. 3, 1942 |
| 2,275,353 | Engert | Mar. 3, 1942 |
| 2,666,673 | Hughes | Jan. 19, 1954 |